E. E. UNDERWOOD.
EXPOSURE INDICATOR.
APPLICATION FILED OCT. 17, 1918.
1,391,870.
Patented Sept. 27, 1921.
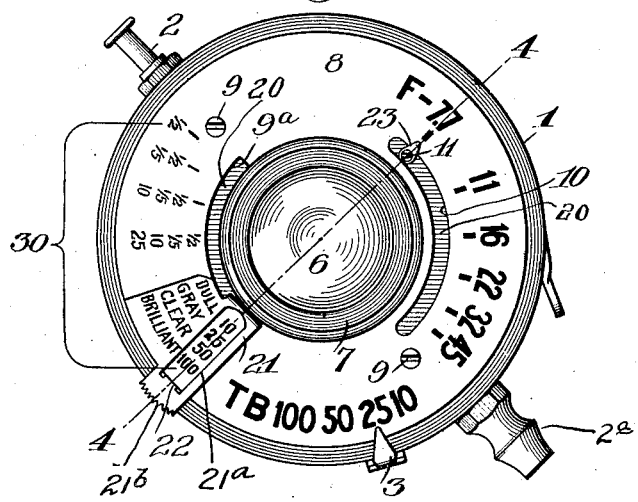
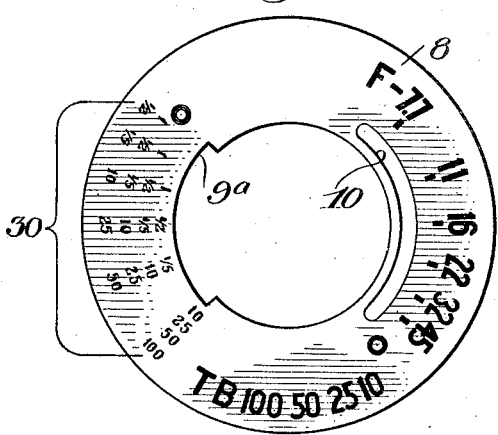
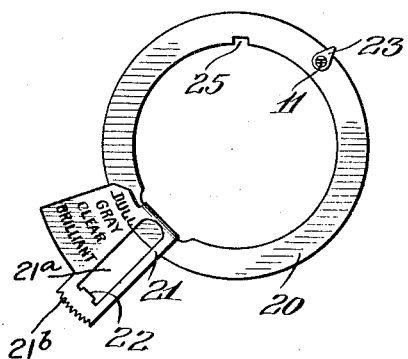
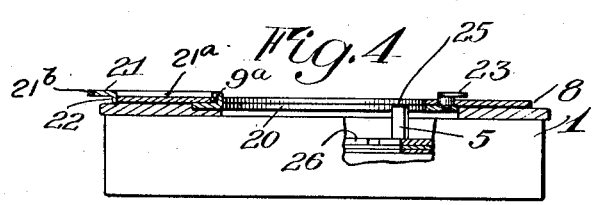
Witnesses:
Nelson A. Hallauer
Nelson H. Copp
INVENTOR
Ernest E. Underwood
BY
his ATTORNEYS

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

EXPOSURE-INDICATOR.

1,391,870.  Specification of Letters Patent.  Patented Sept. 27, 1921.

Application filed October 17, 1918. Serial No. 258,596.

*To all whom it may concern:*

Be it known that I, ERNEST E. UNDERWOOD, a citizen of the United States, residing at Rochester, in the county of Monroe and State of New York, have invented certain new and useful Improvements in Exposure-Indicators; and I do hereby declare the following to be a full, clear, and exact description of the invention, such as will enable others skilled in the art to which it appertains to make and use the same.

My present invention has for its objects to provide an exposure indicator adapted particularly for application to photographic shutters, by means of which an unskilled photographer may readily adjust and coordinate the size of the aperture and speed of the shutter to suit the various light conditions prevailing at the moment of exposure to produce the best results, and further to provide a device which may be cheaply constructed and readily applied to shutters of a type on the market.

To these and other ends the invention consists in certain improvements hereinafter described, the novel features being pointed out in the appended claims.

In the drawings:

Figure 1 is a front view of a photographic shutter showing my invention applied thereto;

Fig. 2 a separate view of the scale plate showing the indications thereon;

Fig. 3 a similar view of the adjustable indicator plate, and

Fig. 4 a sectional view of the scale plate and indicator plate assembled, taken on the line 4—4 of Fig. 1.

Similar reference numerals in the several figures indicate similar parts.

The shutter to which I have shown my invention applied is of a usual and well-known type embodying a circular casing 1 having at one side the shutter releasing pin 2 and at the other the nipple $2^a$ for the application of the tube from the shutter operating bulb. 3 indicates a member which controls in the usual or in any preferred manner the speed at which the shutter is operated, and also whether it is to be set or operated for "time" or "bulb" exposure. 6 indicates the lens and 7 the lens tube.

8 indicates an annular scale plate secured to the front of the shutter casing by screws 9 or otherwise, having near its periphery the scale containing indications for the exposure opening F 7.7, 11, 16, 22, 32, and 45 and also preferably bearing the scale containing the speed indications 10, 25, 50 and 100 indicating the fractions of a second within which the instantaneous exposures are made and also bearing the letters "T" and "B" indicating "time" and "bulb" exposures and with this scale the pointer or indicator 3 is adapted to coöperate. The scale plate also contains a plurality of series of time or speed indications designated collectively by the numeral 30, each containing numerals such as 1, $\frac{1}{2}$, and $\frac{1}{5}$ indicating one second, one-half second, one-fifth second, particularly adapted for hand controlled or automatically controlled or time exposures and in addition thereto the numerals corresponding to the fractions of seconds indicated on the speed scale with which the pointer 3 coöperates— viz. 10, 25, 50, and 100. In the present embodiment the corresponding numerals in each series from the inner one outward, are arranged one step or indication to the left or clockwise of the preceding series, so that a radial line from the center of the lens will extend through, say, 10, 25, 50, and 100 or $\frac{1}{5}$, 10, 25, 50, as the case may be.

The scale plate 8 is provided at one side of the central opening with a segmental recess $9^a$ and on the opposite side with a segmental slot 10 adjacent to the scale relating to the exposure apertures.

The adjustable indicator or member for adjusting the exposure aperture and coöperating with the scale plate, consists of a ring 20 stamped from sheet metal and provided at one side with an integral wing or lug 21 bent outwardly and extending parallel with the plane of the ring and over the face of the scale plate 8, the connecting bend of the metal being accommodated in the segmental recess $9^a$ of the scale plate. The wing 21 has formed in it an aperture or slot $21^a$ through which one numeral in each series of the speed indications 30 on the scale plate are visible, and because of the described relative arrangement of the series, this slot extends radially of the ring. The end of the wing is serrated as shown at $21^b$, so that it may be readily operated and at the end of the slot is provided an ear 22 bent down and adapted to engage and slide upon the periphery of the plate 8, as shown in Fig. 4 and at the side of the slot are provided words indicating generally the character of the light or its actinic value as determined by the sky, as for instance, "Dull", "Gray", "Clear", "Brilliant", the first-mentioned word being in line with the indications on the inner series.

At the side of the ring plate opposite the wing 21 is provided an indicator lug 23 passing through the segmental slot 10 in the scale plate and coöperating with the aperture scale. In the present instance this lug 23 is separate from the ring and secured by a screw 11 but it might be otherwise formed or secured if desired.

The indicator member or plate 20 is connected to and operates the aperture controlling mechanism of the shutter, in the present embodiment by providing a recess 25 therein (Figs. 3 and 4) for the reception of a lug 5 on a ring 26 actuating in the usual manner, the blades of the usual iris diaphragm.

In setting the device for use the operator may first take into consideration any one of the factors or conditions necessary for a proper exposure, that is the size of the exposure aperture, or the character or actinic value of the light as determined by the sky, or the speed to be given the shutter as determined by whether the object photographed is in motion, and may then set the indicator plate for the automatic indication of the others. Suppose, however, he decides that the exposure requires the full lens aperture, as for instance in the form shown, F 7.7— he then moves the indicator ring until the pointer 23 is coincident with that indication as shown in Fig. 1, thereby adjusting the iris diaphragm for full operation. The slot in the wing now exposes the speed indications 10, 25, 50, and 100, and if the actinic value of the light is poor as indicated by the sky characteristic "Gray", he sets the shutter speed indicator 3 opposite the figure 25 in accordance with the indication 25 exposed adjacent the word "Gray" on the wing at the side of the slot in the ring plate and makes the exposure. Or he may determine the shutter speed first and turn the ring indicator until the light characteristic word appears opposite the corresponding figure, when the diaphragm will be set for the proper aperture, and in either event the properly coördinated indications will result.

It will be noted that the shutter speed indications of each series that are visible through the slot in the wing of the indicator and are adjacent the light character indications thereon, are in proportion to the actinic value of the light as determined by the character indications, and that the aperture indications on the scale with which the indicator 23 coöperates are so arranged that as the ring is moved to indicate slower shutter speeds the exposure aperture decreases proportionately in size. That is, referring to Fig. 1, opposite the word "Dull" the figure 10 appears indicating an exposure of one tenth of a second when the light is poor, and opposite the word "Brilliant" is 100 indicating an exposure of one hundredth of a second when the light is excellent, and as the indicator ring is moved clockwise to the next row of speed indications indicating slower speeds, the exposure apertures decrease in size.

In the present arrangement, the size of the exposure aperture is directly controlled by the movement of the ring 20 and therefore for the purpose of the proper coördination of the parts it is not essential that these sizes be indicated visually and the scale F 7.7, 11, etc., might be dispensed with but it is desirable that these be preserved because a skilled photographer would probably determine the size of the aperture in the first instance.

By forming the parts of sheet material as shown, the device may be cheaply and expeditiously formed, assembled and applied to photographic shutters of a type in use and a structure having the same capabilities may be adapted for other forms of shutter by a simple rearrangement of the indications on the scale plate and the movable member, to accomplish the same results without departing from my invention.

I claim:

1. An exposure device for photographic shutters comprising a movable aperture adjusting member, a scale having a plurality of different light character indications connected thereto and movable therewith, and shutter speed indications for each of said light character indications whereby the aperture formed by the adjustment of the member indicates automatically the appropriate shutter speeds for each of the light character indications.

2. In an exposure device for photographic shutters, the combination with an aperture adjusting member and a scale having a plurality of series of shutter speed indications, of a movable indicator controlling the operation of the aperture adjusting device and having a plurality of different light character indications connected therewith, each coöperating with one series of the speed indications but with an indication for a different speed.

3. In an exposure device for photographic shutters, the combination with an aperture adjusting member, a scale for indicating different apertures, and a scale having a plurality of series of shutter speed indications, of a movable indicator controlling the operation of the aperture adjusting device and coöperating with the aperture scale and having a plurality of light character indications connected therewith, each coöperating with one series of the speed indications but with an indication for a different speed.

4. In an exposure device for photographic shutters the combination with a scale having a plurality of aperture indications, and a scale having a plurality of series of shutter speed indications, of an indicator coöperating with the aperture indications, and having a plurality of different light character indications thereon each coöperating with one series of the shutter speed indications but with an indication for a different speed, and an indicator movable with the first mentioned one and coöperating with the aperture scale, the indications on said scales being so arranged with reference to each other and to the indicators that the sizes of the indicated apertures are in proportion to the indicated shutter speeds.

5. In an exposure indicator for photographic shutters with a scale containing a plurality of aperture indications and a scale containing a plurality of series of shutter speed indications arranged in parallel rows the similar speed indications in each series being located out of registering alinement, in combination with a relatively movable indicator plate having a plurality of different light character indications thereon, one coöperating with each series of speed indications and an indicator coöperating with the aperture indications.

6. In an exposure indicator for photographic shutters a scale containing a plurality of spaced aperture indications and a scale containing a plurality of series of spaced shutter speed indications arranged in parallel rows and progressively increasing in speed indication toward the end, the corresponding speed indications in each adjacent series being located one space out of registering alinement, in combination with a relatively movable indicator plate having an indicator coöperating with the aperture indications and also a plurality of different light character indications each of the latter alining with a different series of the speed indications, the parts being so correlated that the relative adjustments of the plate and scales to indicate successively smaller shutter apertures will indicate corresponding decreases in shutter speed for the different light-character indications.

7. The combination with a front plate for photographic shutters provided with an aperture scale, a speed scale and a plurality of concentric series of shutter speed indications thereon, of an adjustable indicator having a pointer coöperating with the aperture scale and a plurality of different light-character indications thereon, one for each scale on the plate and each registering with a different speed indication in the various positions of adjustment.

8. The combination with a scale plate adapted to be secured to the casing of a photographic shutter and having a plurality of series of indications thereon, of an indicator ring rotarily adjustable on the inner side of said plate and having a wing extending over the outer face thereof provided with a plurality of indications thereon coöperating with the series on the plate.

9. The combination with an apertured scale plate adapted to be secured to the casing of a photographic shutter having two sets of indications thereon, of an indicator ring rotarily adjustable on the inner side of the plate having an indicator coöperating with one set or series of indications and a wing extending over the outer face of the plate and bearing a plurality of indications thereon coöperating with the other set or series on the plate.

10. The combination with the apertured scale plate having a segmental slot, of the adjustable ring arranged in rear of the plate provided with the integral wing extending through the aperture therein and over the outer face of the indicator plate and the lug extending through the segmental slot and over the face of the plate.

11. The combination with the apertured scale plate having the segmental slot, of the rotary indicator ring having the integral slotted wing extending from its inner side through the aperture in the scale plate and over the outer face of the scale plate and provided at the opposite side with a lug extending through the segmental slot.

ERNEST E. UNDERWOOD.